United States Patent
Ichikawa

(10) Patent No.: US 7,861,023 B2
(45) Date of Patent: Dec. 28, 2010

(54) MULTIUSER KVM SWITCH

(75) Inventor: Daisuke Ichikawa, Shinagawa (JP)

(73) Assignee: Fujitsu Component Limited, Tokyo (JP)

(*) Notice: Subject to any disclaimer, the term of this patent is extended or adjusted under 35 U.S.C. 154(b) by 74 days.

(21) Appl. No.: 12/320,491

(22) Filed: Jan. 27, 2009

(65) Prior Publication Data

US 2009/0193171 A1 Jul. 30, 2009

(30) Foreign Application Priority Data

Jan. 28, 2008 (JP) .............................. 2008-016966

(51) Int. Cl.
*G06F 13/14* (2006.01)
(52) U.S. Cl. ................... 710/200; 710/316; 707/704; 707/783; 709/219; 726/3
(58) Field of Classification Search ................. 710/200, 710/316; 709/203, 205, 219; 707/704, 783, 707/785, 786; 726/3, 28, 29
See application file for complete search history.

(56) References Cited

U.S. PATENT DOCUMENTS

| | | | |
|---|---|---|---|
| 7,441,063 B2 * | 10/2008 | Tseng et al. ................. | 710/305 |
| 7,506,041 B1 * | 3/2009 | Shelton et al. .............. | 709/223 |
| 7,640,382 B2 * | 12/2009 | Blackwell et al. ............. | 710/74 |
| 2005/0044184 A1 * | 2/2005 | Thomas et al. .............. | 709/219 |
| 2005/0066106 A1 * | 3/2005 | Lee ........................... | 710/316 |
| 2007/0174535 A1 * | 7/2007 | Lou et al. .................. | 710/316 |
| 2008/0183940 A1 * | 7/2008 | Lou ........................... | 710/316 |
| 2009/0265488 A1 * | 10/2009 | Birger ........................ | 710/64 |

FOREIGN PATENT DOCUMENTS

| | | |
|---|---|---|
| JP | 2002-342385 | 11/2002 |
| JP | 2005-18135 | 1/2005 |

* cited by examiner

*Primary Examiner*—Glenn A Auve
(74) *Attorney, Agent, or Firm*—Staas & Halsey LLP

(57) ABSTRACT

A multiuser KVM switch that is connected between a plurality of consoles used by respective users and a plurality of servers, including: a setting portion that sets lock of an operation right for each server; and a prohibition portion that, when at least one operation right of the servers is locked by the setting portion, prohibits the consoles used by other users from operating a server in which the operation right is locked.

23 Claims, 15 Drawing Sheets

FIG. 4

| USER NAME | PASSWORD |
|---|---|
| USER_1 | ZXC001 |
| USER_2 | WAS027 |
| USER_3 | QSE130 |
| ⋮ | ⋮ |
| USER_10 | GED628 |

FIG. 7

USER_1

| USER NAME | AUTHORITY LEVEL | OPERATION RIGHT LEVEL | USAGE CONDITION SERVER NAME/CONSOLE NUMBER |
|---|---|---|---|
| USER_1 | ADMINISTRATOR | 1 | SERVER101 / 201 |
| USER_2 | STANDARD | 10 | ··· / ··· |
| USER_3 | STANDARD | 10 | ··· / ··· |
| USER_4 | ADMINISTRATOR | 1 | ··· / 208 |
| USER_5 | ADMINISTRATOR | 1 | ··· / ··· |
| USER_6 | STANDARD | 10 | SERVER103 / 202 |
| USER_7 | STANDARD | 10 | SERVER106 / 205 |
| USER_8 | STANDARD | 10 | ··· / ··· |
| USER_9 | STANDARD | 10 | ··· / 204 |
| USER_10 | STANDARD | 10 | SERVER104 / 207 |

SERVER NAME: SERVER 101, CONSOLE NUMBER: 201

FIG. 8

| USER_1 | | | |
|---|---|---|---|
| USER NAME | AUTHORITY LEVEL | OPERATION RIGHT LEVEL | USAGE CONDITION SERVER NAME/CONSOLE NUMBER |
| USER_1 | ADMINISTRATOR | 1 | SERVER101 / 201 |
| USER_2 | STANDARD | 4 | ··· / ··· |
| USER_3 | STANDARD | 5 | ··· / ··· |
| USER_4 | ADMINISTRATOR | 2 | ··· / 208 |
| USER_5 | ADMINISTRATOR | 2 | ··· / ··· |
| USER_6 | STANDARD | 6 | SERVER103 / 202 |
| USER_7 | STANDARD | 7 | SERVER106 / 205 |
| USER_8 | STANDARD | 8 | ··· / ··· |
| USER_9 | STANDARD | 9 | ··· / 204 |
| USER_10 | STANDARD | 10 | SERVER104 / 207 |

SERVER NAME: SERVER 101, CONSOLE NUMBER: 201

FIG. 9

USER_1

| SERVER NAME | ACCESS LEVEL | USAGE CONDITION |
|---|---|---|
| SERVER101 | 1 | USER_1 |
| SERVER102 | ADMINISTRATOR | ... |
| SERVER103 | 4 | USER_6 |
| SERVER104 | 6 | USER_10 |
| SERVER105 | ADMINISTRATOR | ... |
| SERVER106 | 10 | USER_7 |
| SERVER107 | 10 | ... |
| SERVER108 | 10 | ... |

SERVER NAME: SERVER 101  CONSOLE NUMBER: 201

FIG. 10

| USER_1 | DISABLE SETTING SCREEN |

USER NAME      : USER_3, USER_8

CONSOLE NUMBER: 206

SERVER NAME    : SERVER108

COMBINATION    : USER_8 /SERVER107, SERVER108

SERVER NAME: SERVER 101, CONSOLE NUMBER: 201

[ OK ]  [ CANCEL ]

FIG. 12A

```
USER_6              SETTING SCREEN OF USE
                    PERMISSION OF SERVER

SERVER NAME     :    SERVER 101

PURPOSE OF USE  :    MAINTENANCE

OPERATING TIME  :    30 MINUTES

URGENT DEGREE   :    HIGH

SERVER NAME: SERVER 106, CONSOLE NUMBER: 206

[ OK ]   [ CANCEL ]
```

FIG. 12B

```
NOTIFICATION OF USE
PERMISSION(USER_6)

PURPOSE OF USE  :    MAINTENANCE

OPERATING TIME  :    30 MINUTES

URGENT DEGREE   :    HIGH

● PERMITTING USE OF SERVER
        ○ RELEASING LOCK OF OPERATION RIGHT
        ○ NOT PERMITTING USE OF SERVER

[ OK ]   [ CANCEL ]
```

MULTIUSER KVM SWITCH

BACKGROUND OF THE INVENTION

1. Field of the Invention

The present invention relates to a multiuser KVM switch in which a plurality of user operate different servers, respectively.

2. Description of the Related Art

Conventionally, there has been known a KVM switch including modules, each of which has a plurality of ports connecting to a plurality of computers (see Japanese Patent Application Publication No. 2005-18135).

Further, there has been known a multiuser KVM switch which is connected between a plurality of servers and a plurality of consoles (each console includes a mouse, a keyboard, and a monitor), and switches a server connected to each console to other server, as an example of a KVM switch.

In a current multiuser KVM switch, the number of users that uses a single server is one, and a plurality of users cannot use the single server at the same time.

Conventionally, there has been known a cooperated design support system which supports work for simultaneously and parallel editing the same design data included in a single server by using a plurality of terminals (see Japanese Patent Application Publication No. 2002-342385). The cooperated design support system manages an operation right of each user by a worker list and authority setting, and achieves cooperation work.

However, in the conventional multiuser KVM switch, when the user switches a server to be operated to other server, and try to operate the former server again, the user may not be able to operate the former server if other user operates the former server.

Although the cooperated design support system manages the operation right of each user so that the users can use the same design data included in the single server, the multiuser KVM switch manages the operation right of each user so that the users operate the different servers, respectively. Therefore, the multiuser KVM switch is different from the cooperated design support system in a management method of the operation right of each user.

SUMMARY OF THE INVENTION

It is an object of the present invention to provide a multiuser KVM switch in which each user can smoothly operate a desired server.

According to a first aspect of the present invention, there is provided a multiuser KVM switch that is connected between a plurality of consoles used by respective users and a plurality of servers, including: a setting portion that sets lock of an operation right for each server; and a prohibition portion that, when at least one operation right of the servers is locked by the setting portion, prohibits the consoles used by other users from operating a server in which the operation right is locked.

With the above arrangement, it is possible to prohibit the consoles used by other users from operating the server in which the operation right is locked, and hence each user can smoothly operate the desired server.

BRIEF DESCRIPTION OF THE DRAWINGS

Preferred embodiments of the present invention will be described in detail with reference to the following drawings, wherein:

FIG. 4 is a diagram showing an example of user authentication data;

FIG. 7 is a diagram showing an example of a display screen of user information displayed on any console by an OSD function;

FIG. 8 is a diagram showing an example of a display screen of user information displayed on any console by the OSD function;

FIG. 9 is a diagram showing an example of a display screen of server information displayed on any console by the OSD function;

FIG. 10 is a diagram showing an example of a disable setting screen of the multiuser KVM switch 1 displayed on any console by the OSD function;

FIG. 12A is a diagram showing an example of a setting screen of use permission of the server in which the operation right is locked;

FIG. 12B is a diagram showing an example of a use permission notification screen notified to a user who has locked the operation right of the server;

DESCRIPTION OF THE PREFERRED EMBODIMENTS

A description will now be given, with reference to the accompanying drawings, of an embodiment of the present invention.

Figure 1:
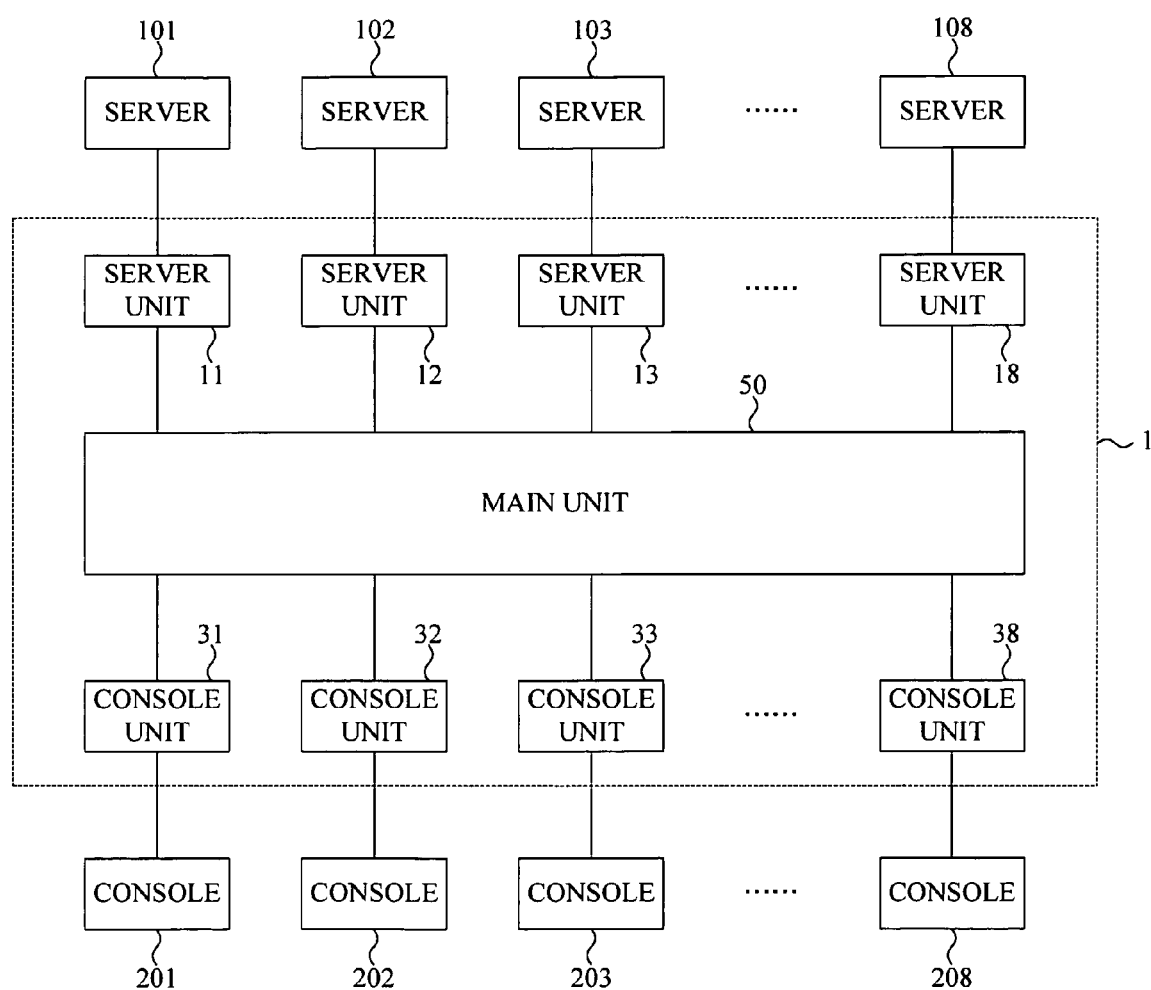
FIG. 1 is a diagram showing the construction of an information processing system including a multiuser KVM switch according to a present embodiment.

FIG. 1 is a diagram showing the construction of an information processing system including a multiuser KVM switch according to a present embodiment.

The information processing system in FIG. 1 includes servers 101 to 108, a multiuser KVM switch 1, and consoles 201 to 208. The multiuser KVM switch 1 can connect up to eight sets of the server and the console. Each of the consoles 201 to 208 includes a monitor, a keyboard, and a mouse. Hereinafter, the monitor is represented by adding a sign "a" to a reference number of the corresponding console, and the keyboard and the mouse are represented by adding a sign "b" to a reference number of the corresponding console.

The multiuser KVM switch 1 includes server units 11 to 18, a main unit 50, and console units 31 to 38. The server units 11 to 18 are connected to the servers 101 to 108, respectively, and the console units 31 to 38 are connected to the consoles 201 to 208, respectively. Cables with a longest length of about 100 meter are connected between the server units 11 to 18 and the main unit 50, and cables with a longest length of about 300 meter are connected between the console units 31 to 38 and the main unit 50.

The main unit 50 in the multiuser KVM switch 1 selectively switches a set of console operating one server to another set of console. That is, one server receives data of the mouse and the keyboard from one set of console, and an RGB signal from the server is output to the monitor of the console.

Although in the present embodiment, the multiuser KVM switch 1 is separated to the server units 11 to 18, the main unit 50, and the console units 31 to 38, any one of the console units 11 to 18 or the server units 31 to 38, or both of them may be integrated with the main unit 50.

Figure 2:
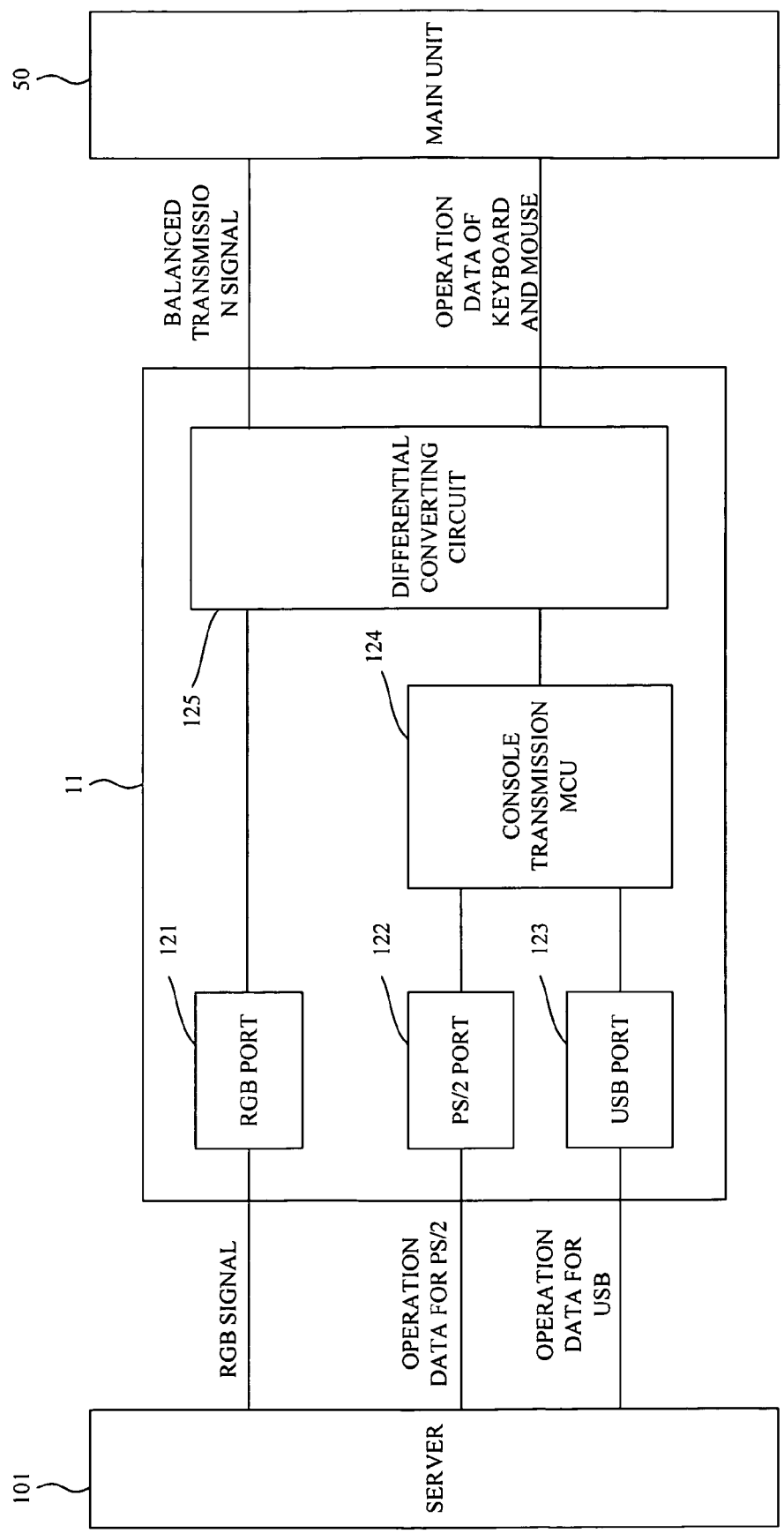
FIG. 2 is a diagram showing the construction of a server unit 11.

FIG. 2 is a diagram showing the construction of the server unit 11.

The server units 11 includes an RGB port 121, a PS/2 port 122, a USB (Universal Serial Bus) port 123, a console transmission MCU (Micro Controller Unit) 124, and a differential converting circuit 125.

The RGB port 121 is connected to the server 101, receives the RGB signal from the server 101, and outputs the RGB signal to the differential converting circuit 125. The differential converting circuit 125 converts the RGB signal into a balanced transmission signal, and outputs the balanced transmission signal to the main unit 50. Moreover, the differential converting circuit 125 receives operation data of the keyboard and the mouse from the main unit 50, converts the operation data into operation data for the PS/2 port 122 or the USB port 123, and outputs the converted operation data to the console transmission MCU 124.

The console transmission MCU 124 outputs the operation data for the PS/2 port 122 or the USB port 123 to the server 101 via the PS/2 port 122 or the USB port 123. The server unit 11 further may include a COM port (communication port) for connecting external equipment thereto. In addition, the USB port 123 can connect to USB equipment other than the server. It should be noted that the construction of the other server units is the same as that of the server unit 11, and hence description thereof is omitted.

Figure 3:
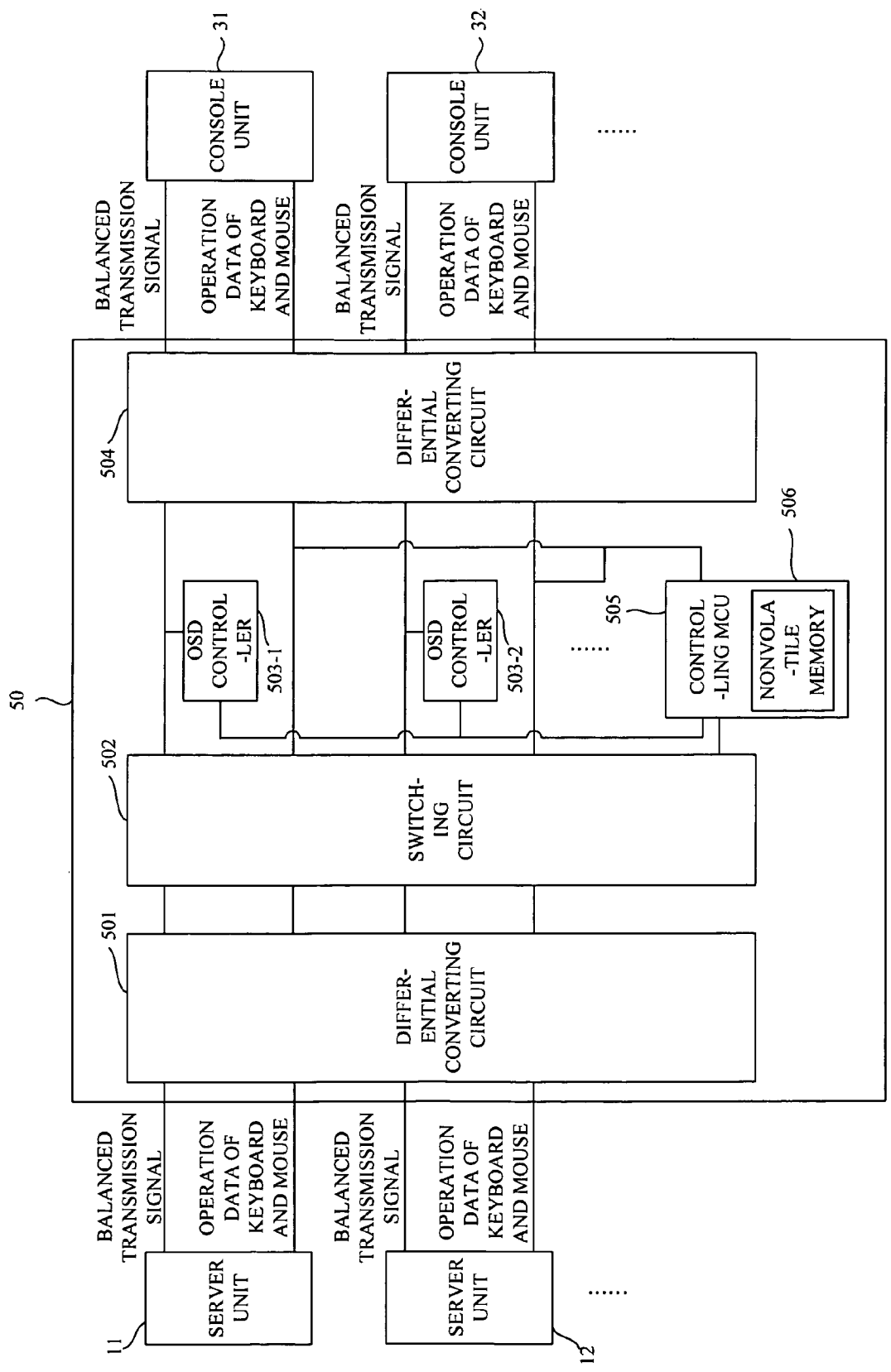
FIG. 3 is a diagram showing the construction of a main unit 50.

FIG. 3 is a diagram showing the construction of the main unit 50.

The main unit 50 includes differential converting circuits 501 and 504, a switching circuit 502, OSD controllers 503-N (N=1, 2, ... ) (an on-screen display portion), and a controlling MCU 505 (a setting portion, a prohibition portion, a permission portion) including a nonvolatile memory 506.

The differential converting circuits 501 converts the balanced transmission signal from each server unit into the RGB signal, outputs the converted RGB signal to the switching circuit 502, and converts the operation data of the keyboard and the mouse into data of a given form. The switching circuit 502 switches the destination of output of the converted RGB signal and the operation data according to a control command of the controlling MCU 505. The OSD controllers 503-N receive data of a setting screen of the OSD (On Screen Display) function stored into the nonvolatile memory 506 from the controlling MCU 505, and output the data to each console unit via the differential converting circuit 504.

The differential converting circuit 504 converts the RGB signal into the balanced transmission signal, and outputs the balanced transmission signal to each console unit. The differential converting circuit 504 converts the operation data into given operation data, and outputs the given operation data to the switching circuit 502.

The controlling MCU 505 controls the action of the switching circuit 502 and the OSD controllers 503-N.

The nonvolatile memory 506 stores user authentication data shown in FIG. 4 which prescribes a relationship between a user name and a password, and is used when the user logs in the multiuser KVM switch 1. Further, the nonvolatile memory 506 stores pieces of data of various setting screens displayed by the OSD (On Screen Display) function.

Figure 5:
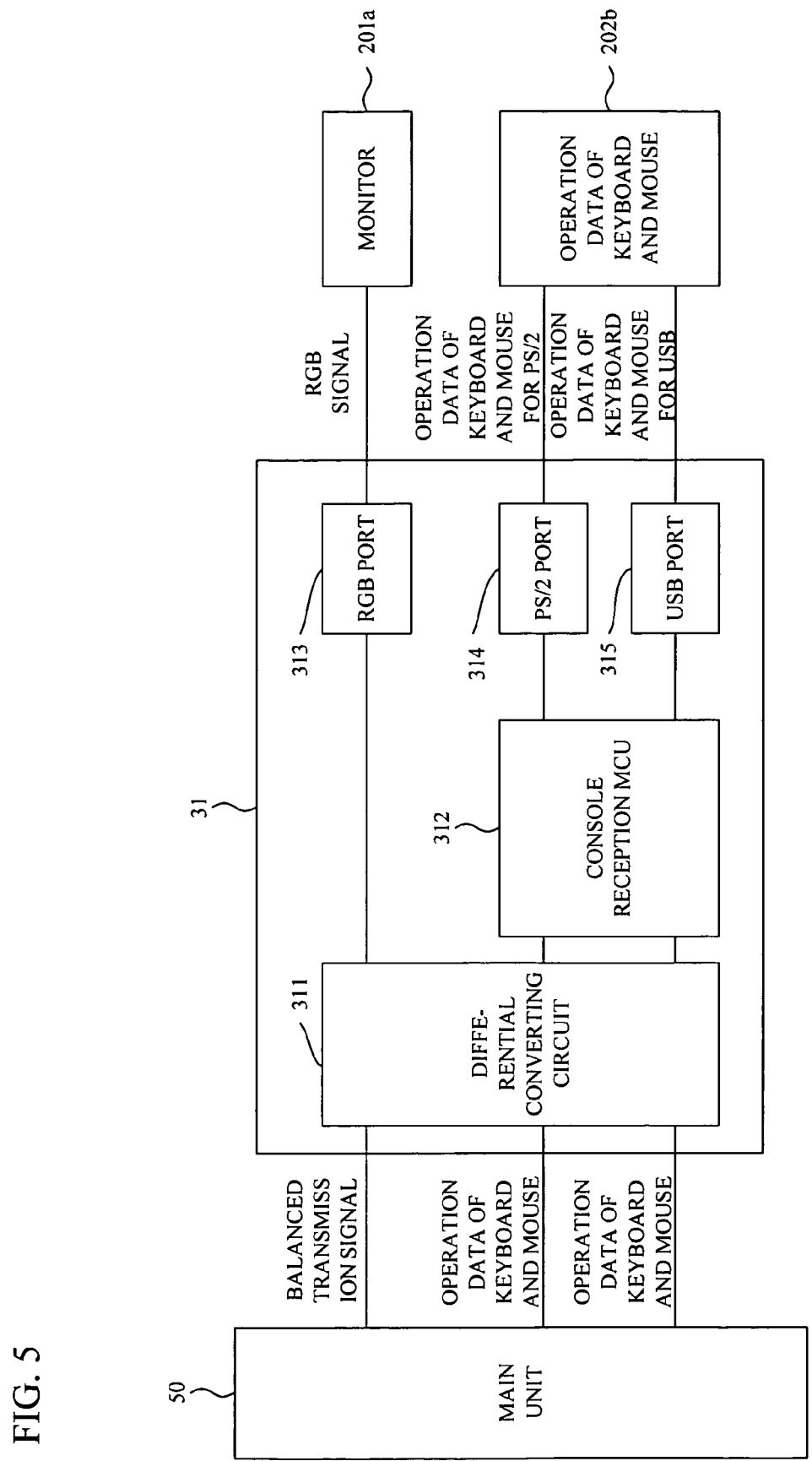
FIG. 5 is a diagram showing the construction of a console unit 31.

FIG. 5 is a diagram showing the construction of the console unit 31.

The console unit 31 includes a differential converting circuit 311, a console reception MCU (Micro Controller Unit) 312, an RGB port 313, a PS/2 port 314, and a USB port 315.

The differential converting circuit 311 converts the balanced transmission signal into the RGB signal, and outputs the RGB signal to the monitor 201*a* via the RGB port 313. The differential converting circuit 311 further receives operation data for the PS/2 port 314 or the USB port 315 from the keyboard or mouse 201*b*, converts the operation data into operation data of the keyboard or mouse, and outputs the converted operation data to the main unit 50.

The RGB port 313 is connected to the monitor 201*a*, and outputs the RGB signal converted with the differential converting circuit 311 to the monitor 201*a*. The console reception MCU 312 outputs the operation data of the keyboard or mouse to the differential converting circuit 311 via the PS/2 port 314 or the USB port 315. The console unit 31 further may include a COM port for connecting external equipment thereto. In addition, the USB port 315 can connect to USB equipment other than the keyboard or mouse. It should be noted that the construction of the other console units is the same as that of the console unit 31, and hence description thereof is omitted.

A description will now be given of an authority level and an operation right level of the user registered with the multiuser KVM switch 1.

The user uses any console and registers a user name and a password with the nonvolatile memory 506 in the main unit 50. It should be noted that the number of user registrations is not limited.

When a user to be first registered with the multiuser KVM switch 1 registers the user name and the password with the user authentication data stored into the nonvolatile memory 506, the authority level of the user becomes an administrator authority level. When a user to be additionally registered uses any console and registers the user name and the password with the user authentication data stored into the nonvolatile memory 506, the authority level of the user becomes a standard authority level. It should be noted that the authority level of the user includes the administrator authority level which can execute various settings including setting of valid or invalid operation of each server from each console or each user, and the standard authority level which can set a part of functions.

When the user having the administrator authority level additionally registers a new user, the user can set the authority level of the new user to any one of the administrator authority level and the standard authority level.

Figure 6:
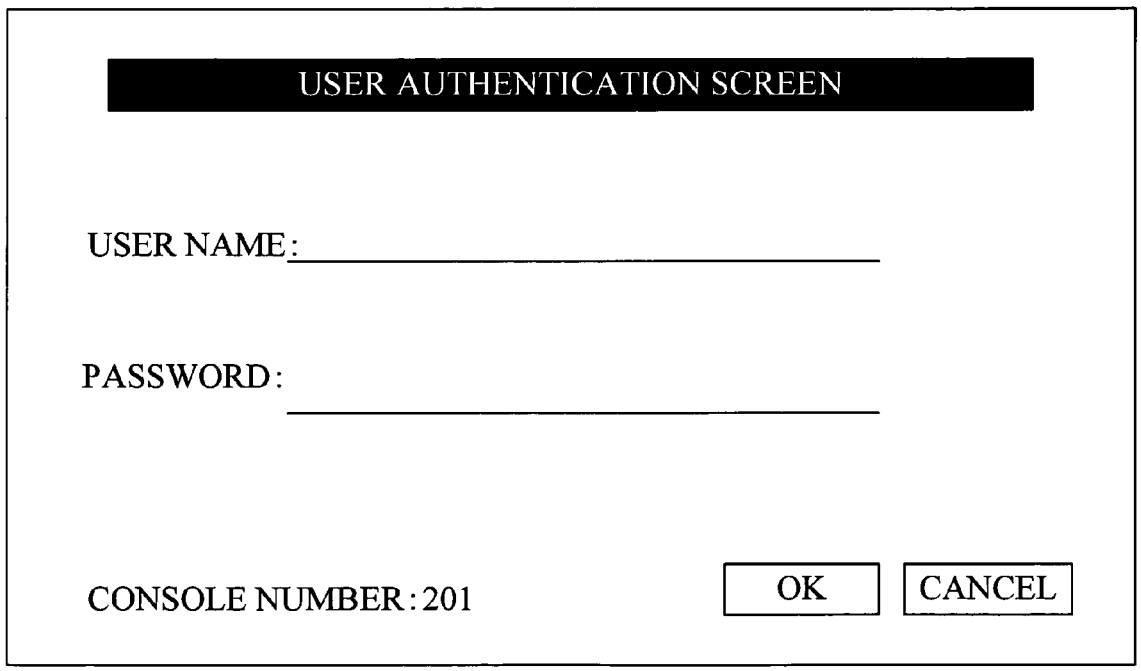
FIG. 6 is a diagram showing an example of a user authentication screen displayed on a console when a user logs in a multiuser KVM switch 1.

FIG. 6 is a diagram showing an example of a user authentication screen displayed on the console when a user logs in the multiuser KVM switch 1.

The number of the console used by the user is displayed on the user authentication screen. When the user inputs the user name and the password, the information of the user name and the password is transmitted to the controlling MCU 505 of the main unit 50 via the console unit corresponding to the console used by the user, and the controlling MCU 505 executes user authentication based on the input user name, the input password, and the user authentication data stored into the nonvolatile memory 506. When the user authentication is permitted, the controlling MCU 505 accesses the server that the user requests. On the other hand, when the user authentication is not permitted, the controlling MCU 505 transmits information to the effect that user attestation has failed, to the corresponding OSD controller. The OSD controller transmits the information to the effect that user attestation has failed, to the console used by the user, and causes the console to display the information.

FIGS. 7 and 8 are diagrams showing examples of the display screen of user information displayed on any console by an OSD function. Specifically, FIG. 7 shows an initial state, and FIG. 8 shows a state of custom setting.

When each user inputs a command to read user information to an in-use console, the command to read user information is transmitted to the controlling MCU 505, and data of the display screen of the user information is transmitted from the controlling MCU 505 to the in-use console via the corresponding OSD controller, and displayed on the in-use console.

In the display screen of the user information in FIGS. 7 and 8, a user's list is displayed, and the authority level, the operation right level and usage condition of each user can be confirmed.

The operation right level is set for each user besides the authority level. The operation right level is used to decide whether the operation of each server is possible, and compared with an access level of the server described later. When a value of the operation right level which is lower than that of the access level of the server is set, the user can access the server. When the value of the operation right level which is higher than that of the access level of the server is set, the user cannot access the server. It should be noted that setting information of the operation right level and the access level for each user is stored into the nonvolatile memory 506, and referred to by the controlling MCU 505.

When the operation right level is "1", it is the most highest level. The larger the number of the operation right level, the lower the operation right level. The user having the high operation right level can obtain the operation right of the server by higher priority than the user having the low operation right level, i.e., can access the server by higher priority than the user having the low operation right level.

When the user name and the password are registered with the nonvolatile memory 506, the controlling MCU 505 automatically assigns the highest operation right level "1" to the user having the administrator authority level, and the lowest operation right level "10" to the user having the standard authority level, as shown in FIG. 7. The lowest operation right level is changed depending on the number of users. When twenty users are registered, for example, the lowest operation right level is "20".

The user having the administrator authority level can change the setting of the operation right level on the display screen of FIG. 7 or FIG. 8, but the user having the standard authority level cannot change the setting of the operation right level. When the user having the administrator authority level executes operation to change the operation right level of FIG. 7 to the operation right level of FIG. 8 for example, the controlling MCU 505 stores setting information of the changed operation right level of FIG. 8 into the nonvolatile memory 506. This makes it possible to manage a user accessible to each server by using the authority level and the operation right level.

When the user having the administrator authority level does not set the operation right level to an individual user, the controlling MCU 505 divides and assigns the operation right level roughly into the user having the administrator authority level and the user having the standard authority level, as shown in FIG. 7.

When the user having the administrator authority level operates to separately assign the users values of the number of registered users (e.g., from "1" to "10") as the operation right levels of the respective users according to the number of users, the controlling MCU 505 stores the setting information of the separate operation right level for each user into the nonvolatile memory 506. This makes it possible to manage a user accessible to each server by using the value of the operation right level. Further, the user having the administrator authority level can operate to assign the users the operation right levels of the same number, or can set the superiority of the operation right level to the users having the same authority level.

FIG. 9 is a diagram showing an example of the display screen of server information displayed on any console by the OSD function.

When each user inputs a command to read the server information to the in-use console, the command to read the server information is transmitted to the controlling MCU 505, and data of the display screen of server information is transmitted from the controlling MCU 505 to the in-use console via the corresponding OSD controller, and displayed on the in-use console.

An access level is set to each server. Setting information of the access level for each server is stored into the nonvolatile memory 506. The access level sets the prohibition of the operation of the server according to the authority level or the operation right level. When the access level is set at a level equal to or more than the administrator authority level, the administrator authority level is needed for the operation of the server to which the access level is set, and the user having the standard authority level cannot operate the server. When the access level is set to the operation right level (e.g. "4"), the user having an operation right level (e.g. "1" to "4") equal to or more than the set operation right level only can operate the server, and the user having an operation right level (e.g. "10") less than the set operation right level cannot operate the server.

The user having the administrator authority level can change the access level of the server, but the user having the standard authority level cannot change the access level of the server.

The controlling MCU 505 determines whether to permit the operation of any server from any user based on the setting information of the access level for each server in FIG. 9 and the setting information of the operation right level and the authority level for each server in FIGS. 7 and 8.

FIG. 10 is a diagram showing an example of a disable setting screen of the multiuser KVM switch 1 displayed on any console by the OSD function.

When each user inputs a command to read the disable setting screen to the in-use console, the command to read the disable setting screen is transmitted to the controlling MCU 505, and data of the disable setting screen is transmitted from the controlling MCU 505 to the in-use console via the corresponding OSD controller, and displayed on the in-use console.

In the disable setting screen of FIG. 10, the user having the administrator authority level can set the prohibition of the operation from a specific user, the prohibition of the operation from a specific console, or the prohibition of the operation to a specific server. Also, the operation of the user can be prohibited by a combination of the user name, the number of the console, and the server name. With respect to the user and the console in which the operation of a single server is prohibited, the operation to all servers from the user and the console is prohibited, so that the user and the console cannot operate all servers. With respect to the server in which the operation is prohibited, the operation to the server from all users is prohibited. In an example of FIG. 10, the operation to all servers from users of "User_3" and "User_8" and the console 206 is prohibited. Further, the operation to the servers 107 and 108 from the user of "User_8" is prohibited. The user which has executed this setting is "User_1" and uses the server 101 via the console 201.

The information set in the disable setting screen is stored into the nonvolatile memory 506. The controlling MCU 505 prohibits the operation from the specific user, the operation from the specific console, or the operation to the specific server based on the information set in the disable setting screen. This makes it possible to prohibit at least one of the operation from the specific user, the operation from the specific console, and the operation to the specific server.

When the user in which the operation is prohibited logs in, the controlling MCU 505 displays the prohibition of the operation on the user authentication screen via the corresponding OSD controller. When the access is carried out by the console in which the operation is prohibited, the controlling MCU 505 displays the prohibition of the operation on the screen of the console via the corresponding OSD controller. When the access to the server in which the operation is prohibited is requested, the controlling MCU 505 displays the prohibition of the operation on the screen of the console via the corresponding OSD controller.

The user having the administrator authority level can release the prohibition of the operation of the user or the console, or the prohibition of the operation to the server by properly deleting the setting information of the disable setting screen in FIG. 10.

Figure 11:
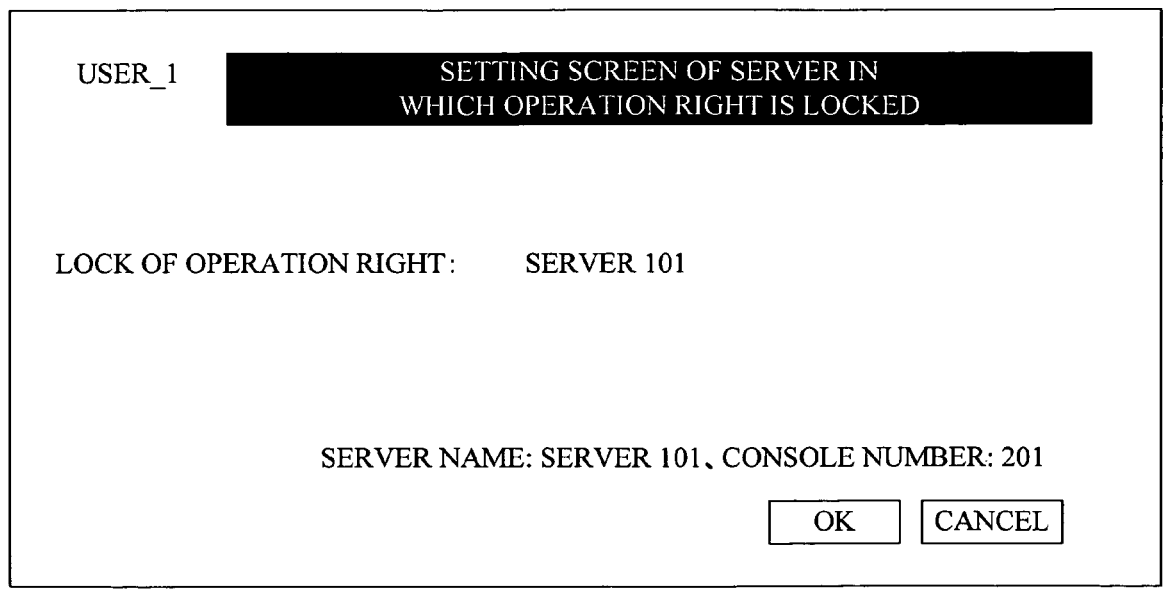
FIG. 11 is a diagram showing an example of a setting screen of a server in which an operation right is locked, which is displayed on any console by the OSD function.

FIG. 11 is a diagram showing an example of a setting screen of a server in which the operation right is locked, which is displayed on any console by the OSD function.

Particularly, FIG. 11 shows an example in which the user of "User_1" locks the operation right of the current in-use server 101 via the console 201.

When each user inputs a command to read setting screen of the server in which the operation right is locked, to the in-use console, the command to read setting screen of the server in which the operation right is locked is transmitted to the controlling MCU 505, and data of the setting screen is transmitted from the controlling MCU 505 to the in-use console via the corresponding OSD controller and is displayed.

When each user switches the current in-use server to other server, and it is desired that the current in-use server is not used by other user, each user inputs a target server name to the setting screen of the server in which the operation right is locked, in FIG. 11, and depresses an OK button.

The controlling MCU 505 locks the operation right of the server based on the target server name input to the setting screen, and prohibits the operation to the server from other users until the lock of the operation right is released.

FIG. 12A is a diagram showing an example of a setting screen of use permission of the server in which the operation right is locked, and FIG. 12B is a diagram showing an example of a use permission notification screen notified to a user who has locked the operation right of the server.

When the user wants to use the server in which the operation right is locked, the user inputs a command to read the setting screen of use permission of the server in which the operation right is locked, to the in-use console, and depresses an OK button. The command to read the setting screen of use permission of the server is transmitted to the controlling MCU 505, and data of the setting screen is transmitted from the controlling MCU 505 to the in-use console via the corresponding OSD controller and is displayed.

When the server name of the server which the user wants to use, a purpose of use, an operating time and an urgent degree are input to the setting screen of use permission in FIG. 12A, and an OK button is depressed, the in-use console transmits to the controlling MCU 505 information indicative of the server name of the server which the user wants to use, the purpose of use, the operating time and the urgent degree, and a command to request the use permission of the server, and the controlling MCU 505 displays the use permission notification screen in FIG. 12B on the console of the user who uses the server now via the corresponding OSD controller. Therefore, information to the effect that the use permission of the server is requested can be notified to the user who has locked the operation right of the server.

In the example of FIG. 12A, the operation right of the server 101 is locked, and it is set that the server 101 is used for 30 minutes for purpose of maintenance and the urgent degree is high. In FIG. 12B, the purpose of use, the operating time and the urgent degree of the server which are set in the setting screen of use permission, and the user name of the user requesting the use permission of the server are displayed, and any one of items "permitting use of server", "releasing lock of operation right" and "not permitting use of server" is selectable. Therefore, information for making a decision whether to permit the use of the server can be provided for the user who has locked the operation right of the server, and the user who now uses the server in which the operation right is locked can decide whether to open the operation right of the server to other users.

When the user who has locked the operation right receives the notification of the use permission, selects the item "permitting use of server", and depresses the OK button, the controlling MCU 505 releases the lock of the operation right of the server to the user who requests the use permission of the server. When the operation of the server is completed by the user who requests the use permission of the server, the controlling MCU 505 notifies the console used by the user who has locked the operation right that the operation of the server is completed, and locks the operation of the server again. When the user who has locked the operation right receives the notification of the use permission, selects the item "releasing lock of operation right", and depresses the OK button, the controlling MCU 505 releases the lock of the operation right of the present server. In this case, if the operation of the server is completed by the user who requests the use permission of the server, the operation right of the server is not locked. When the user who has locked the operation right receives the notification of the use permission, selects the item "not permitting use of server", and depresses the OK button, the controlling MCU 505 notifies the console used by the user who has locked the operation right that the use of the server is not permitted.

Figure 13A:
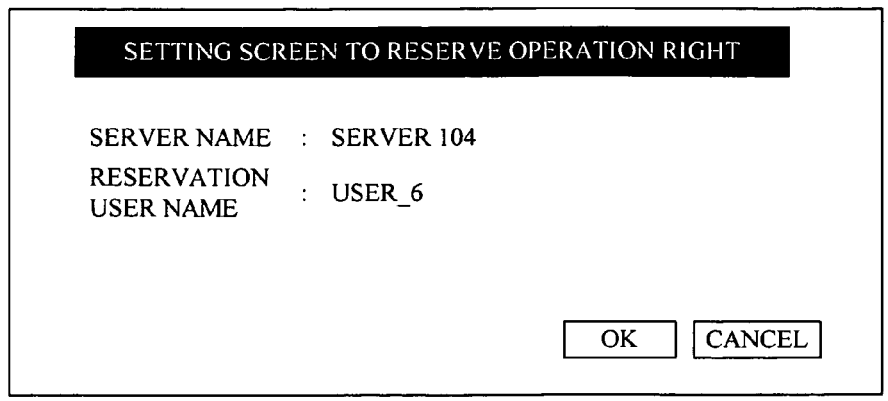
FIG. 13A is a diagram showing an example of a setting screen to reserve the operation right of the server.
Figure 13B:
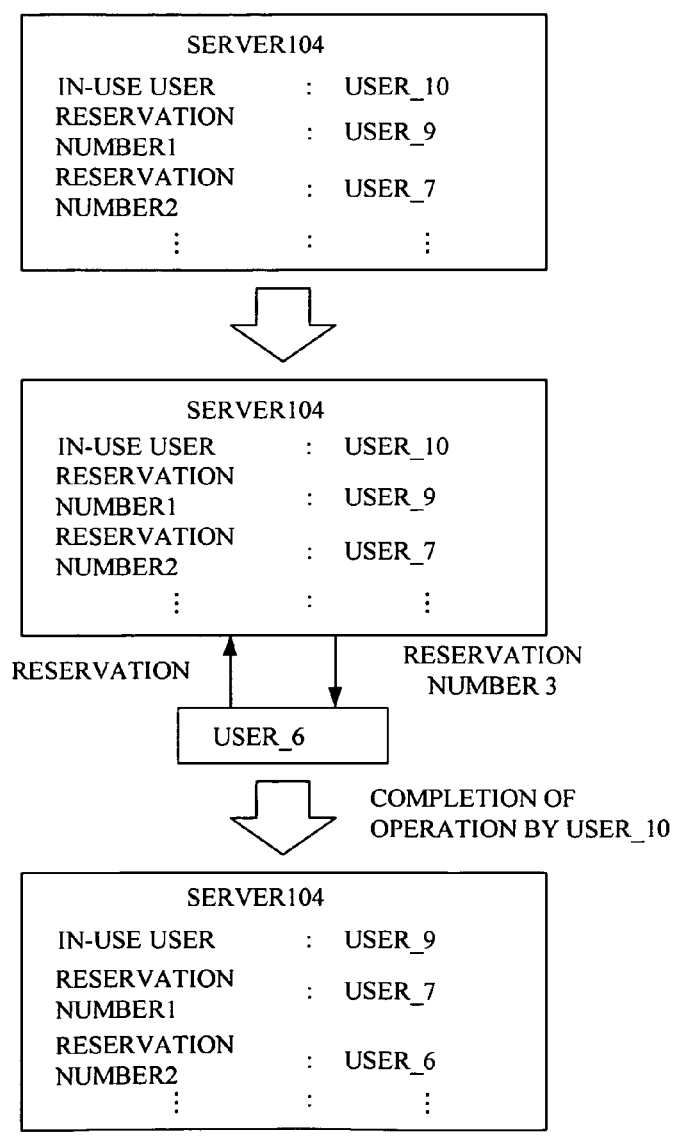
FIG. 13B is a diagram showing a transition state of reservation condition and usage condition of the server.
Figure 14:
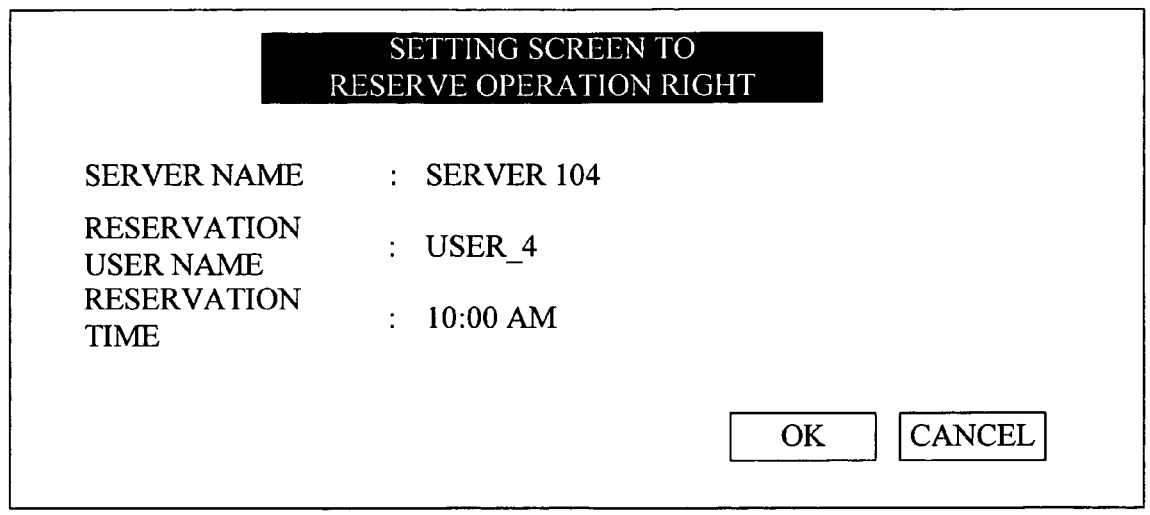
FIG. 14 is a diagram showing a variation of the setting screen to reserve the operation right of the server.

FIG. 13A is a diagram showing an example of a setting screen to reserve the operation right of the server, and FIG. 13B is a diagram showing a transition state of reservation condition and usage condition of the server. FIG. 14 is a diagram showing a variation of the setting screen to reserve the operation right of the server.

The setting screen to reserve the operation right of the server in FIG. 14 is different from that in FIG. 13A in that time can be appointed.

When the user wants to reserve the operation right of the server, the user inputs a command to read the setting screen to reserve the operation right of the server, to the in-use console, and depresses an OK button. The command to read the setting screen to reserve the operation right of the server is transmitted to the controlling MCU 505, and data of the setting screen is transmitted from the controlling MCU 505 to the in-use console via the corresponding OSD controller and is displayed.

When the server name of the server which the user wants to reserve, and a user name are input to the setting screen to reserve the operation right of the server in FIG. 13A and the OK button is depressed, or the server name of the server which the user wants to reserve, the user name and the reservation time are input to the setting screen to reserve the operation right of the server in FIG. 14 and the OK button is depressed, the controlling MCU 505 receives a reservation of the operation right of the corresponding server. Therefore, each user can reserve the operation right of the server in advance, or appoint time and reserve the operation right of the server, and hence each user can smoothly operate a desired server.

The controlling MCU 505 gives reservation numbers 1, 2, 3 . . . to those who reserve the operation right of the server on a first-come-first-served basis. In FIG. 13B, a present user of the server 104 is "User_10" in an initial state, the user of the reservation number 1 is "User_9", and the user of the reservation number 2 is "User_7". When the user of "User_6" reserves the server 104, the user of "User_6" obtains the reservation number 3. When the user of "User_10" completes the operation of the server 104, the operation right of the server 104 shifts to "User_9" of the reservation number 1, and other reservation numbers are incremented by 1. Thus, when the user operating the server terminates the operation of the server, the controlling MCU 505 shifts the operation right of the server to the user of the reservation number 1. The reservation numbers 2, 3, 4 . . . are incremented by 1, to thereby become reservation numbers 1, 2, 3 . . . .

When a reservation person of the operation right of the server inputs a command to identify one's reservation number to the in-use console, the command is transmitted to the controlling MCU 505, and the screen showing the reservation condition and the usage condition of the server as shown in FIG. 13B is transmitted to the in-use console via the corresponding OSD controller and is displayed. Therefore, the reservation person of the operation right of the server can identify one's reservation number.

When the operation right of the server shifts to the user of reservation number 1 if the user is operating another server, the controlling MCU 505 notifies the in-use console via the corresponding OSD controller that the order of the reserved server has come. Therefore, the user can operate the desired server without forgetting the reservation of the server.

When the user of the reservation number 1 does not switch the server to be operated from the present in-use server to the reserved server even if a given time (e.g. 10 minutes) has passed after the order of the reserved server is notified, the controlling MCU 505 invalidates the reservation, and shifts the operation right of the server to the next reservation person.

Figure 15A:
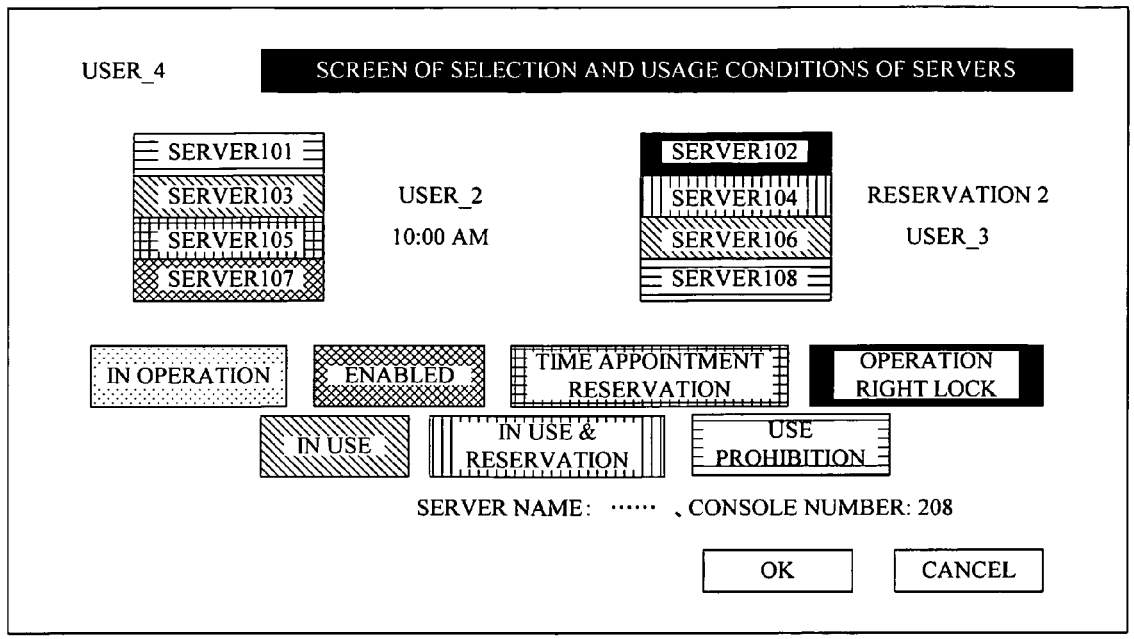
FIG. 15A is a diagram showing a screen of selection and usage conditions of servers, where a color for each server has been separately displayed.
Figure 15B:
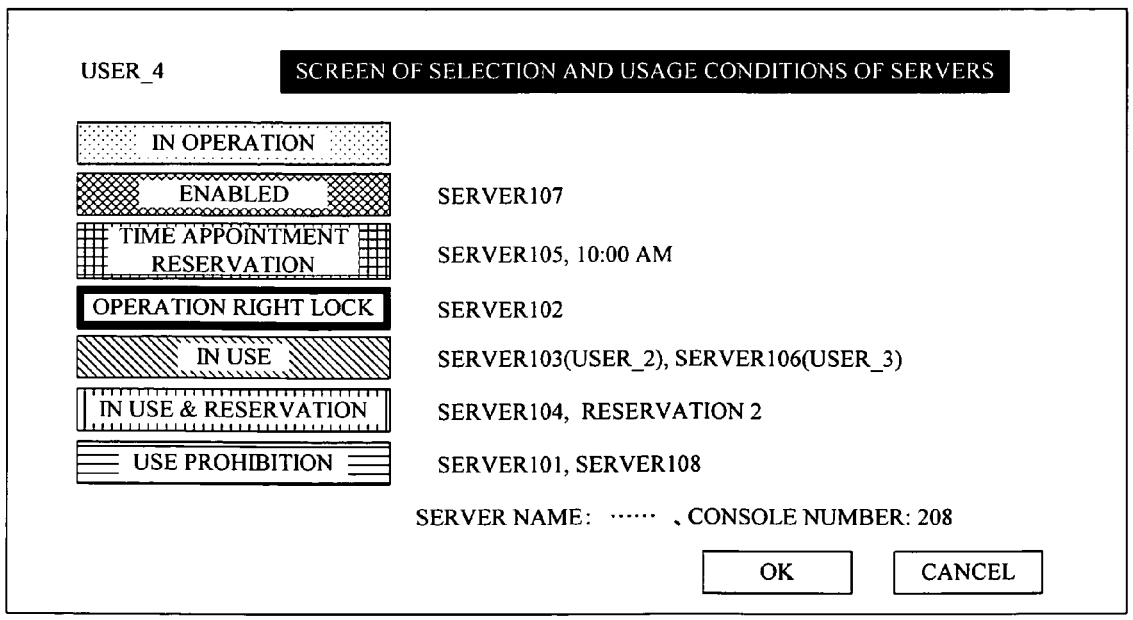
FIG. 15B is a diagram showing a screen of selection and usage conditions of servers, where a color for each usage condition has been separately displayed.

FIG. 15A is a diagram showing a screen of selection and usage conditions of servers, where a color for each server has been separately displayed, and FIG. 15B is a diagram showing a screen of selection and usage conditions of servers, where the color for each usage condition has been separately displayed.

When each user inputs a command to read the screen of selection and usage conditions of the servers to the in-use console, the command to read the screen of selection and usage conditions of the servers is transmitted to the controlling MCU 505, and data of the screen is transmitted from the controlling MCU 505 to the in-use console via the corresponding OSD controller and is displayed.

When any user appoints 10 a.m. and reserves the operation right of the server 105, the screen of selection and usage conditions of the servers displays that the server 105 is reserved from 10 a.m., as shown in FIGS. 15A and 15B. In this case, other user can operate the server 105 till 10 a.m. However, when the current time approaches 10 a.m. (e.g. the current time is 9:45 a.m.), the controlling MCU 505 notifies the console of the user who now uses the server 105 that the current time is near to the reservation time of other user, and requests the completion of the operation. When the user who has reserved the operation right of the server 105 uses other server, the controlling MCU 505 also notifies the console of the user who has reserved the operation right of the server 105 that the current time is near to the reservation time of other user, and requests to switch to the reserved server 105. The controlling MCU 505 shifts the operation right of the server 105 to the reservation user from 10 a.m. Even if a given time (e.g. 10 minutes) has passed from 10 a.m., when the user who has reserved the server 105 does not execute the operation of the server 105, the controlling MCU 505 may invalidate the reservation, and shift the operation right of the server 105 to the next reservation person.

In the screen of FIGS. 15A and 15B, the usage conditions of the servers are displayed in addition to the server name. The usage conditions of the servers are classified into seven items "in operation", "enabled", "time appointment reservation", "operation right lock", "in use", "in use & reservation", and "use prohibition". In FIG. 15A, each item is separated by a color, and each server name is painted with a color of the corresponding item and displayed. In FIG. 15B, each item is separated by a color, and each server name is displayed next to the corresponding item. Therefore, each user can confirm the usage condition of each server by color.

The item "in operation" designates a server which the user using the console displaying the screen is operating, and the item "in use" designates a server which other user is operating. With respect to the in-use server, the user name is displayed next to the server name. The item "enabled" designates a server which can be used now. The item "time appointment reservation" designates a server in which the operation right is reserved, and the reservation time thereof. The item "operation right lock" a server in which the operation right is locked. The item "in use & reservation" designates a server which is being operated now by other user, and in which the operation right is reserved. The item "use prohibition" designates a server from which the use is prohibited now. With respect to the server which is being operated now by other user, and in which the operation right is reserved, the number of reservations is displayed next to the server name.

When each user selects the server corresponding to the item "enabled" or "time appointment reservation" in the screen of FIGS. 15A and 15B, the controlling MCU 505 displays the setting screen to switch the server, or to appoint time and reserve the operation right of the server as shown in FIG. 14 on the console used by the corresponding user. When each user selects the server corresponding to the item "in use" or "in use & reservation" in the screen of FIGS. 15A and 15B, the controlling MCU 505 displays the setting screen to reserve the operation right of the server as shown in FIG. 13A, or the setting screen to appoint time and reserve the operation right of the server as shown in FIG. 14 on the console used by the corresponding user. Thereby, each user can reserve the operation right of the server. Further, when each user selects the server corresponding to the item "in operation" in the screen of FIGS. 15A and 15B, the controlling MCU 505 displays the setting screen of the server in which the operation right is locked or the lock of the operation right is released, as shown in FIG. 11, on the console used by the corresponding user. Thereby, each user can lock the operation right of the server or release the lock of the operation right. When each user selects the server corresponding to the item "operation right lock" in the screen of FIGS. 15A and 15B, the controlling MCU 505 displays the setting screen of use permission of the server in which the operation right is locked, on the console used by the corresponding user. Thereby, each user can inquire of the user using the server the use permission of the operation right of the server.

It should be noted that all setting screens mentioned above can be always displayed at any position in the screen of the console used by the user.

As described in detail hereinabove, according to the present embodiment, the controlling MCU 505 sets the lock of the operation right for each server based on the server name input to the setting screen of the server locking the operation right in FIG. 11, and prohibits the consoles used by other users from operating the server in which the operation right is locked. Therefore, each user can smoothly operate a desired server.

Also, the controlling MCU 505 sets the reservation of the operation right for each server based on the server name and the user name input to the setting screen to reserve the operation right of the server in FIGS. 13A and 14. When at least one operation right of the servers is reserved, the controlling MCU 505 permits the operation of the reserved server from the console used by the user who has reserved the operation right of the server, according to reservation order. Therefore, each user can reserve the operation right of the server in advance, and hence each user can smoothly operate a desired server.

When the controlling MCU 505 in the main unit 50 executes the software program supplied from the outside, the same effects as those of the above described embodiment can also be achieved.

It should be noted that the present invention is not limited to the embodiment, and various modifications may be made to them without departing from the scope of the invention.

Finally, several aspects of the present invention are summarized below.

According to a first aspect of the present invention, there is provided a multiuser KVM switch that is connected between a plurality of consoles used by respective users and a plurality of servers, including: a setting portion that sets lock of an operation right for each server; and a prohibition portion that, when at least one operation right of the servers is locked by the setting portion, prohibits the consoles used by other users from operating a server in which the operation right is locked.

With the above arrangement, it is possible to prohibit the consoles used by other users from operating the server in which the operation right is locked, and hence each user can smoothly operate the desired server.

Preferably, when use permission of the server in which the operation right is locked is requested from the consoles used by other users, the prohibition portion notifies a console used by a user now using the server in which the operation right is locked, that the use permission of the server in which the operation right is locked is requested.

With the above arrangement, the user who locked the operation right of the server can be notified that the use permission of the server is requested.

More preferably, a purpose of use, an operating time and an urgent degree are described in a notification by the prohibition portion.

With the above arrangement, information for making a decision whether to permit the use of the server can be provided for the user who locked the operation right of the server.

Preferably, the prohibition portion executes any one of releasing the lock of the operation right of the server depending on an instruction from the console used by the user now using the server in which the operation right is locked, permitting the use of the server in which the operation right is locked, from the consoles used by other users, and not permitting the use of the server in which the operation right is locked, from the consoles used by other users.

With the above arrangement, the user now using the server in which the operation right is locked can decide whether to open the operation right of the server to other users.

According to a second aspect of the present invention, there is provided a multiuser KVM switch that is connected between a plurality of consoles used by respective users and a plurality of servers, including: a setting portion that sets lock of an operation right for each server; and a permission portion that, when at least one operation right of the servers is reserved, permits the operation of the reserved server from a console used by a user who reserved the operation right of the server, according to reservation order.

With the above arrangement, each user can reserve the operation right of the server in advance, and hence each user can smoothly operate the desired server.

Preferably, the setting portion further sets reservation time of the operation right of each server.

With the above arrangement, each user can appoint time and reserve the operation right of the server, and hence each user can smoothly operate the desired server.

Preferably, when the order of the user who reserved the operation right of the server has come, the permission portion notifies the console used by the user who reserved the operation right of the server that the order of the user has come.

With the above arrangement, the user who reserved the operation right of the server is notified that the order of the user has come, and hence the user can operate the desired server without forgetting the reservation of the server.

Preferably, the multiuser KVM switch further includes an on-screen display portion that display various screen data on the consoles used by the users, wherein when a command to identify a reservation number is input from the console used by the user who reserved the operation right of the server, the permission portion controls the on-screen display portion so as to display data of a screen showing reservation condition and usage condition of the server on the console used by the user who reserved the operation right of the server.

With the above arrangement, the user who reserved the operation right of the server can identify one's reservation number.

Preferably, the setting portion sets an authority level and an operation right level for each user, and an access level for each server, and the permission portion permits the operation of the server from the console used by the user having the operation right level more than or equal to a given authority level set as the access level or a given operation right level set as the access level.

With the above arrangement, it is possible to manage the user(s) accessible to each server by using the authority level and the operation right level.

More preferably, the authority level includes an administrator authority level that is able to execute various settings including setting of valid or invalid operation of each server from each console or each user, and a standard authority level that is able to set a part of functions.

With the above arrangement, it is possible to manage the user(s) accessible to each server by classifying the user(s) into any one of the administrator authority level and the standard authority level.

More preferably, the setting portion sets separate operation right level to each user by using values from 1 to the number of registered users as the operation right levels of the respective users.

With the above arrangement, it is possible to manage the user(s) accessible to each server by using the values of the operation right level.

More preferably, the setting portion sets the prohibition of at least one of operation from a specific console, operation from a specific user, and operation to a specific server.

With the above arrangement, it is possible to prohibit at least one of the operation from the specific console, the operation from the specific user, and the operation to the specific server.

Still more preferably, the setting portion combines at least two of operation from the specific console, operation from the specific user, and operation to the specific server, to set the prohibition of operations.

With the above arrangement, it is possible to prohibit the operation satisfying a condition in which at least two of the operation from the specific console, the operation from the specific user, and the operation to the specific server are combined.

More preferably, the on-screen display portion displays on the console used by each user in list form a relationship between each user name, the authority level corresponding to each user name, the operation right level corresponding to each user name, and the server and the console used by each user.

With the above arrangement, each user can confirm the authority levels of the respective users, the operation right levels of the respective users, and the servers and the consoles used by respective users.

More preferably, the on-screen display portion classifies the plurality of servers into items of "in operation", "enabled", "time appointment reservation", "operation right lock", "in use", "in use & reservation", and "use prohibition", separates the server names by colors of the respective items, and displays the items and the colored server names on the console used by each user in list form.

With the above arrangement, each user can confirm usage condition of each server by color.

More preferably, the on-screen display portion classifies the plurality of servers into items of "in operation", "enabled", "time appointment reservation", "operation right lock", "in use", "in use & reservation", and "use prohibition", separates the items by colors, and displays the colored items on the console used by each user in list form.

With the above arrangement, each user can confirm usage condition of each server by color.

Still more preferably, the on-screen display portion displays the server name of an in-use server, and the user name of the user using the server now so as to correspond to the item of "in use".

With the above arrangement, each user can confirm the server name of the in-use server, and the user name of the user using the server.

Still more preferably, the on-screen display portion displays the server name of an in-use server, and the number of reservations of the operation right of the server so as to correspond to the item of "in use & reservation".

With the above arrangement, each user can confirm the server name of the in-use server, and the number of reservations of the operation right of the server.

Still more preferably, the on-screen display portion displays the server name of an in-use server, and reservation time of the operation right of the server so as to correspond to the item of "time appointment reservation".

With the above arrangement, each user can confirm the server name of the in-use server, and the reservation time of the operation right of the server.

Still more preferably, when the user selects the server name corresponding to the item of "enabled" or "time appointment reservation", the permission portion controls the on-screen display portion so as to display the screen data to permit the use of the server, or to appoint time and reserve the operation right of the server on the console used by the user.

With the above arrangement, the user can quickly use a usable server or reserve the operation right of the usable server.

Still more preferably, when the user selects the server name corresponding to the item of "in operation", the permission portion controls the on-screen display portion so as to display the screen data to lock the operation right of the server or to release the lock of the operation right on the console used by the user.

With the above arrangement, the user can lock the operation right of the server or release the lock of the operation right.

Still more preferably, when the user selects the server name corresponding to the item of "operation right lock", the permission portion controls the on-screen display portion so as to display the screen data to set use permission of the server on the console used by the user.

With the above arrangement, the user can request the use permission of the server to a user who locked the operation right of the server.

Still more preferably, when the user selects the server name corresponding to the item of "in use" or "in use & reservation", the permission portion controls the on-screen display portion so as to display the screen data to reserve the operation right of the server or to appoint time and reserve the operation right of the server on the console used by the user.

With the above arrangement, the user can reserve the operation right of the server or appoint time and reserve the operation right of the server.

The Present application is based on Japanese Patent Application No. 2008-016966 filed Jan. 28, 2008, the entire disclosure of which is hereby incorporated by reference.

What is claimed is:

1. A multiuser KVM switch that is connected between a plurality of consoles used by respective users and a plurality of servers, comprising:
   a setting portion that locks an operation right for each server; and
   a prohibition portion that, when at least one operation right of the servers is locked by the setting portion, prohibits the consoles used by other users from operating a server in which the operation right is locked.

2. The multiuser KVM switch as claimed in claim 1, wherein when use permission of the server in which the operation right is locked is requested from the consoles used by other users, the prohibition portion notifies a console used by a user now using the server in which the operation right is locked, that the use permission of the server in which the operation right is locked is requested.

3. The multiuser KVM switch as claimed in claim 2, wherein a purpose of use, an operating time and an urgent degree are included in a notification by the prohibition portion.

4. The multiuser KVM switch as claimed in claim 1, wherein the prohibition portion executes only one of (1) releasing the lock of the operation right of the server depending on an instruction from the console used by the user now using the server in which the operation right is locked, (2) permitting the use of the server in which the operation right is locked, from the consoles used by other users, or (3) not permitting the use of the server in which the operation right is locked, from the consoles used by other users.

5. A multiuser KVM switch that is connected between a plurality of consoles used by respective users and a plurality of servers, comprising:
   a setting portion that reserves an operation right for each server; and
   a permission portion that, when at least one operation right of the servers is reserved, permits the operation of the reserved server from a console used by a user who reserved the operation right of the server, according to a reservation order.

6. The multiuser KVM switch as claimed in claim 5, wherein the setting portion further sets reservation time of the operation right of each server.

7. The multiuser KVM switch as claimed in claim 6, wherein when the user who reserved the operation right of the server is next in the order, the permission portion notifies the console used by the user who is next in order that the user is next in the order.

8. The multiuser KVM switch as claimed in claim 5, further comprising an on-screen display portion that displays various screen data on the consoles used by the users,
   wherein when a command to identify a reservation number is input from the console used by the user who reserved the operation right of the server, the permission portion controls the on-screen display portion so as to display data of a screen showing reservation condition and usage condition of the server on the console used by the user who reserved the operation right of the server.

9. The multiuser KVM switch as claimed in claim 8, wherein the on-screen display portion displays on the console used by each user in list form a relationship between each user name, the authority level corresponding to each user name, the operation right level corresponding to each user name, and the server and the console used by each user.

10. The multiuser KVM switch as claimed in claim 8, wherein the on-screen display portion classifies the plurality of servers into items of "in operation", "enabled", "time appointment reservation", "operation right lock", "in use", "in use & reservation", and "use prohibition", separates server names by colors of the respective items, and displays the items and the colored server names on the console used by each user in list form.

11. The multiuser KVM switch as claimed in claim 8, wherein the on-screen display portion classifies the plurality of servers into items of "in operation", "enabled", "time appointment reservation", "operation right lock", "in use", "in use & reservation", and "use prohibition", separates the items by colors, and displays the colored items on the console used by each user in list form.

12. The multiuser KVM switch as claimed in claim 10, wherein the on-screen display portion displays a server name of an in-use server, and the user name of the user using the server now so as to correspond to the item of "in use".

13. The multiuser KVM switch as claimed in claim 10, wherein the on-screen display portion displays a server name of an in-use server, and a number of reservations of the operation right of the server so as to correspond to the item of "in use & reservation".

14. The multiuser KVM switch as claimed in claim 10, wherein the on-screen display portion displays a server name of an in-use server, and reservation time of the operation right of the server so as to correspond to the item of "time appointment reservation".

15. The multiuser KVM switch as claimed in claim 10, wherein when the user selects a server name corresponding to the item of "enabled" or "time appointment reservation", the permission portion controls the on-screen display portion so as to display the screen data to permit the use of the server, or to appoint a time and reserve the operation right of the server on the console used by the user.

16. The multiuser KVM switch as claimed in claim 10, wherein when the user selects a server name corresponding to the item of "in operation", the permission portion controls the on-screen display portion so as to display the screen data to lock the operation right of the server or to release the lock of the operation right on the console used by the user.

17. The multiuser KVM switch as claimed in claim 10, wherein when the user selects a server name corresponding to the item of "operation right lock", the permission portion controls the on-screen display portion so as to display the screen data to set use permission of the server on the console used by the user.

18. The multiuser KVM switch as claimed in claim 10, wherein when the user selects a server name corresponding to the item of "in use" or "in use & reservation", the permission portion controls the on-screen display portion so as to display the screen data to reserve the operation right of the server or to appoint a time and reserve the operation right of the server on the console used by the user.

19. The multiuser KVM switch as claimed in claim 5, wherein the setting portion sets an authority level and an operation right level for each user, and an access level for each server, and the permission portion permits the operation of the server from the console used by the user, wherein the user has the operation right level more than or equal to a given authority level set as the access level or a given operation right level set as the access level.

20. The multiuser KVM switch as claimed in claim 19, wherein the authority level includes an administrator authority level that is able to execute various settings including setting of a valid or invalid operation of each server from each console or each user, and a standard authority level that is able to set functions of the multiuser KVM switch.

21. The multiuser KVM switch as claimed in claim 19, wherein the setting portion sets a separate operation right level to each user by using values from 1 to a number of registered users as the operation right levels of the respective users.

22. The multiuser KVM switch as claimed in claim 19, wherein the setting portion prohibits at least one of operation from a specific console, operation from a specific user, and operation to a specific server.

23. The multiuser KVM switch as claimed in claim 22, wherein the setting portion prohibits at least two of the operation from the specific console, the operation from the specific user, and the operation to the specific server.

* * * * *